(12) United States Patent
Hagiike (10) Patent No.: US 6,547,687 B2
(45) Date of Patent: Apr. 15, 2003

(54) GEAR DEVICE

(75) Inventor: Junji Hagiike, Omori-nishi (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 09/829,977

(22) Filed: Apr. 11, 2001

(65) Prior Publication Data

US 2001/0046919 A1 Nov. 29, 2001

(30) Foreign Application Priority Data

May 25, 2000 (JP) ......................................... 2000-154931

(51) Int. Cl.[7] ................................................. F16H 1/32
(52) U.S. Cl. ......................... 475/181; 475/163; 475/169
(58) Field of Search ............................... 475/163, 169, 475/177, 181, 165, 170, 172

(56) References Cited

U.S. PATENT DOCUMENTS

| | | | | |
|---|---|---|---|---|
| 2,482,568 A | * | 9/1949 | Werner ......................... 310/83 |
| 3,213,711 A | * | 10/1965 | Van Den Kieboom ......... 475/1 |
| 3,918,326 A | * | 11/1975 | Kida et al. ................... 451/343 |
| 4,307,630 A | * | 12/1981 | Osborn et al. ............... 384/138 |
| 4,449,425 A | * | 5/1984 | Carden ......................... 475/162 |
| 5,083,626 A | * | 1/1992 | Abe et al. .................... 180/412 |
| 5,878,624 A | * | 3/1999 | Showalter et al. ............ 74/335 |

* cited by examiner

Primary Examiner—Sherry Estremsky
Assistant Examiner—Tisha D. Lewis
(74) Attorney, Agent, or Firm—Oliff & Berridge, PLC (57) ABSTRACT

A dynamic balance is improved in an S-P-C type planetary gear mechanism. An input shaft is fixed to a disk, and an output shaft is fixed to a planetary gear. A circular recess is formed in the disk so as to be eccentric to the input shaft. A ring gear engaged with the planetary gear is rotatably supported by the circular recess. A weight-reduced portion having the same depth as that of the recess is provided in a part of the disk where the circular recess is not formed, and a weight portion is formed to recover the axial dynamic balance of the disk, which is lost by arranging the circular recess and the ring gear. Since the planetary gear is fixed coaxially to the output shaft, it does not perform an eccentric motion and thus secures the dynamic balance thereof. Accordingly, the dynamic balance in the axial direction is secured for every individual rotating element constructing a gear device.

5 Claims, 8 Drawing Sheets

GEAR DEVICE

BACKGROUND OF THE INVENTION

1. Field of the Invention

The present invention relates to a technology for improving a dynamic balance of a so-called S-P-C type planetary gear mechanism.

2. Description of Related Art

A planetary gear mechanism is known as one of gear devices, in which an axis of an input shaft is made coincident with one of an output shaft. The planetary gear mechanism is, in general, made of three elements, i.e., a sun gear, a planetary gear and a carrier. The sun gear includes at least either one of an external gear and an internal gear (a ring gear). The planetary gear mechanism is classified into various types depending on the combination of above three elements.

Figure 7:
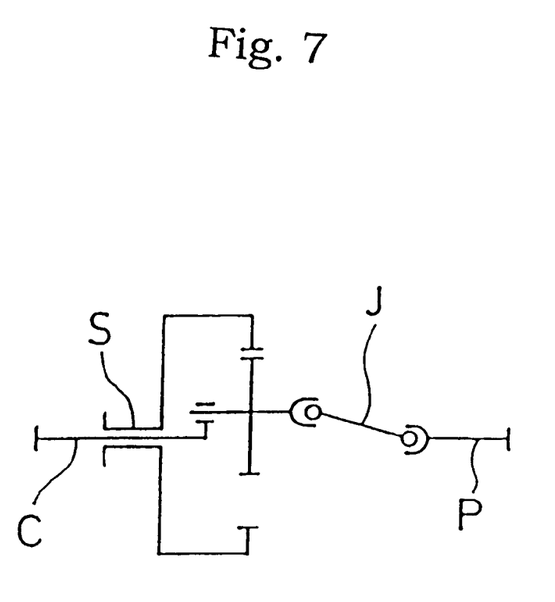
FIG. 7 is a schematic view showing an S-P-C type planetary gear mechanism.

FIG. 7 shows one type of the planetary gear mechanisms, which is called as an S-P-C type planetary gear mechanism. Here, reference numeral S designates a shaft of a sun gear, P designates a shaft of a planetary gear, and C designates a shaft of a carrier, wherein these shafts are arranged as a basic structure. In an example shown in FIG. 7, the shaft C of the carrier serves as an input shaft, and the shaft P of the planetary gear serves as an output shaft. The planetary gear is eccentrically, rotatably supported by the shaft C of the carrier. And, the planetary gear performs rotating and revolving motions while being engaged with the fixed sun gear (the ring gear). The shaft P of the planetary gear is provided with a universal joint J or a linking element equivalent thereto so as to abstract only the revolving motion as an output.

The S-P-C-type planetary gear mechanism gives a relatively large speed-reduction ratio (30:1) using only two gears (the ring gear and the planetary gear) in a state in which the input shaft is arranged coaxially to the output shaft, and therefore becomes highly useful in various fields. In addition, a so-called harmonic drive is also a gear device included in the S-P-C type planetary gear mechanism in the classification.

Figure 8:
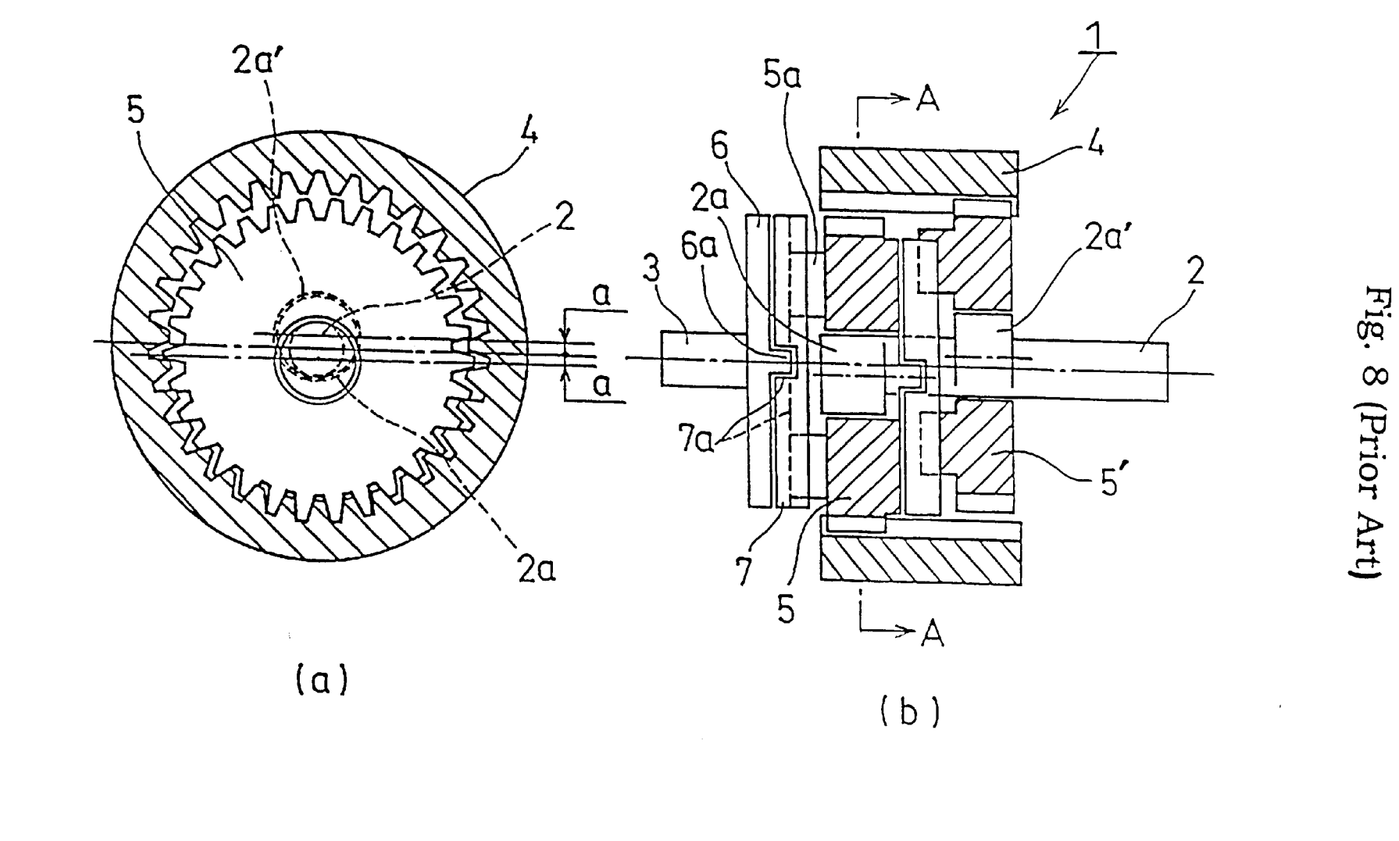
FIG. 8 shows a conventional gear device, in which FIG. 8 (b) is a sectional view showing a major portion of the gear device, and FIG. 8 (a) is a sectional view taken along a line A—A of FIG. 8 (b).

The S-P-C type planetary gear mechanism is essential for suppressing the vibrations associated with an eccentric motion of the planetary gear. FIG. 8 shows a conventional S-P-C type gear device with a construction aiming at suppressing the generation of the vibrations.

A gear device 1 is constructed as that a fixed ring gear 4 and planetary gears 5 and 5' performing the rotating and revolving motions are disposed between an input shaft 2 and an output shaft 3, to thereby perform a speed-reduction of one stage. The input shaft 2 is provided with eccentric portions 2a and 2a' whereby the planetary gears 5 and 5' are supported with an axis in an eccentric state. As shown in FIG. 8(a), if the eccentric portion 2a is made eccentric from the axis of the input shaft 2 by a distance a, the eccentric portion 2a' is made eccentric therefrom by the distance a correspondingly. And, the vibrations caused when the planetary gears 5 and 5' perform the rotating and revolving motions while being engaged with the ring gear 4 are counteracted with each other.

As a linking element corresponding to the universal joint J shown in FIG. 7, a coupling plate 7 is disposed between a flange 6 fixed to the output shaft 3 and the planetary gear 5, and key slots 7a are provided on a surface and a reverse of the coupling plate 7 so as to intersect perpendicularly. A key 6a provided on the flange 6 and a key 5a provided on the planetary gear 5 are slidably engaged respectively with the key slots 7a on the surface and the reverse so as to constitute a universal joint. Although not illustrated in the drawing, a linking element for transmitting the rotating motion of the planetary gear 5' to the output shaft 3 can be constructed by the same arrangement.

In the gear device 1 shown in FIG. 8, when the planetary gear 5 performs the rotating and revolving motions while being engaged with the ring gear 4, the planetary gear 5 and the planetary gear 5' mutually function as a balancer, thereby counteracting their vibrations to each other.

However, the planetary gear 5 and the planetary gear 5' are disposed to be offset from each other in the axial direction (i.e., the direction of axes of the input and output shafts 2 and 3). Consequently, the gear device shown in FIG. 8 secures a static balance among the rotating elements, but does not secure a dynamic balance in the axial direction among the rotating elements. Therefore, in a case the gear device 1 shown in FIG. 8 is required to be driven at a high speed, or under a use condition in which a precise operation is required, there may arise an adverse effect due to the vibrations caused by the dynamic imbalance in the axial direction among the rotating elements.

SUMMARY OF THE INVENTION

The present invention was made in order to solve the above-mentioned problem, and an object thereof is to improve an axial dynamic balance in a so-called S-P-C type planetary gear mechanism, thereby providing a gear device that can suppress the generation of the vibrations under various use conditions. Another object is to simplify the structural complication of the gear device and to provide the precise gear device at low cost.

In order to solve the above-mentioned problem, a gear device according to a first aspect of the present invention is a gear device which performs a speed-reduction of one stage using two gears disposed between an input shaft and an output shaft coaxially arranged, wherein a dynamic balance in an axial direction is secured for every individual rotating element.

In the present invention, the dynamic balance in the axial direction is secured for every individual rotating element, whereby the dynamic balance in the axial direction is secured for the entire gear device.

In the gear device according to a second aspect of the present invention, the rotating elements include a disk that has a circular recess arranged to be eccentric with respect to the input shaft and that is fixed to the input shaft, a ring gear that is rotatably supported by the circular recess and whose rotating motion is restricted so that the ring gear only makes an eccentric motion within the circular recess when the disk is rotated, and a planetary gear that is fixed coaxially to the output shaft and engaged with the ring gear, and a weight portion is formed in the disk to recover the axial dynamic balance which is lost by arranging the circular recess and the ring gear.

In this arrangement, the axial dynamic balance of the disk which is lost by arranging the circular recess and the ring gear is recovered using the weight portion. Moreover, since the planetary gear is fixed coaxially to the output shaft, it does not make the eccentric motion, thereby secures the dynamic balance thereof. Accordingly, the dynamic balance in the axial direction is secured for every individual rotating element.

In the gear device according to a third aspect of the present invention, the weight portion includes a weight-reduced portion formed in a portion of the disk where the recess is not provided, the weight-reduced portion having the same depth as that of the recess. According to the present invention, since the weight portion is formed by the disk per se, it is unnecessary to newly add a member onto the disk for attaining the axial dynamic balance of the disk. By setting the depth of the weight-reduced portion equal to the one of the recess, the axial dynamic balance of the disk is secured, which may otherwise be lost by arranging the circular recess in the disk.

In the gear device according to a fourth aspect of the present invention, the weight-reduced portions have a constitution of a plurality of circular holes having the same diameter. Because the weight-reduced portions are a plurality of circular holes having the same diameter, the number of processing steps for forming the weight- reduced portion is reduced.

In the gear device according to a fifth aspect of the present invention, the weight-reduced portions are constituted as that a plurality of circular holes have diameters gradually varied. By providing as that the weight-reduced portions have a plurality of circular holes with diameters gradually varied, more ideal balance can be attained.

In the gear device according to a sixth aspect of the present invention, the disk is constructed as being dividable in the axial direction as a divided member, thereby offering more capacity to select material for respective portions of the disk. Further, one of the divided members is processed to have the circular recess and the weight-reduced portion, and thereafter integrated with the other divided member, so that the thickness of the circular recess and the one of the weight-reduced portion are easily matched with each other.

In the gear device according to a seventh aspect of the present invention, the rotating element includes a planetary gear that is supported by an axis with an eccentric portion provided on the input shaft, and that is engaged with a fixed ring gear to perform rotating and revolving motions, and wherein the planetary gear is provided with a cavity portion within which a weight potion is provided to recover a balance of the planetary gear.

In this arrangement, by providing the cavity portion in the planetary gear, and locating the weight portion within the cavity portion, the balance of the planetary gear that is supported by the axis with the eccentric portion provided on the input shaft to make the eccentric motion is recovered within the planetary gear. That is, by securing the axial dynamic balance of the planetary gear per se, the axial dynamic balance of the entire gear device can be attained.

In the gear device according to an eighth aspect of the present invention, the weight portion is fixed to the eccentric portion of the input shaft such that the eccentric motion of the center of gravity of the weight portion is opposite to the eccentric motion of the center of gravity of the planetary gear. According to this arrangement, the center of gravity of the planetary gear and the one of the weight portion are constantly positioned to achieve the counterbalancing, and therefore it is possible to secure the axial dynamic balance of the planetary gear that is a rotating element of the gear device.

DETAILED DESCRIPTION OF THE PREFERRED EMBODIMENTS

Hereafter, the embodiments of the present invention will be described with reference to the accompanying drawings. Note that those portions, which are the same as or correspond to the portions in prior arts, are denoted by the same reference numerals, and detailed description for those portions are omitted.

Figure 1:
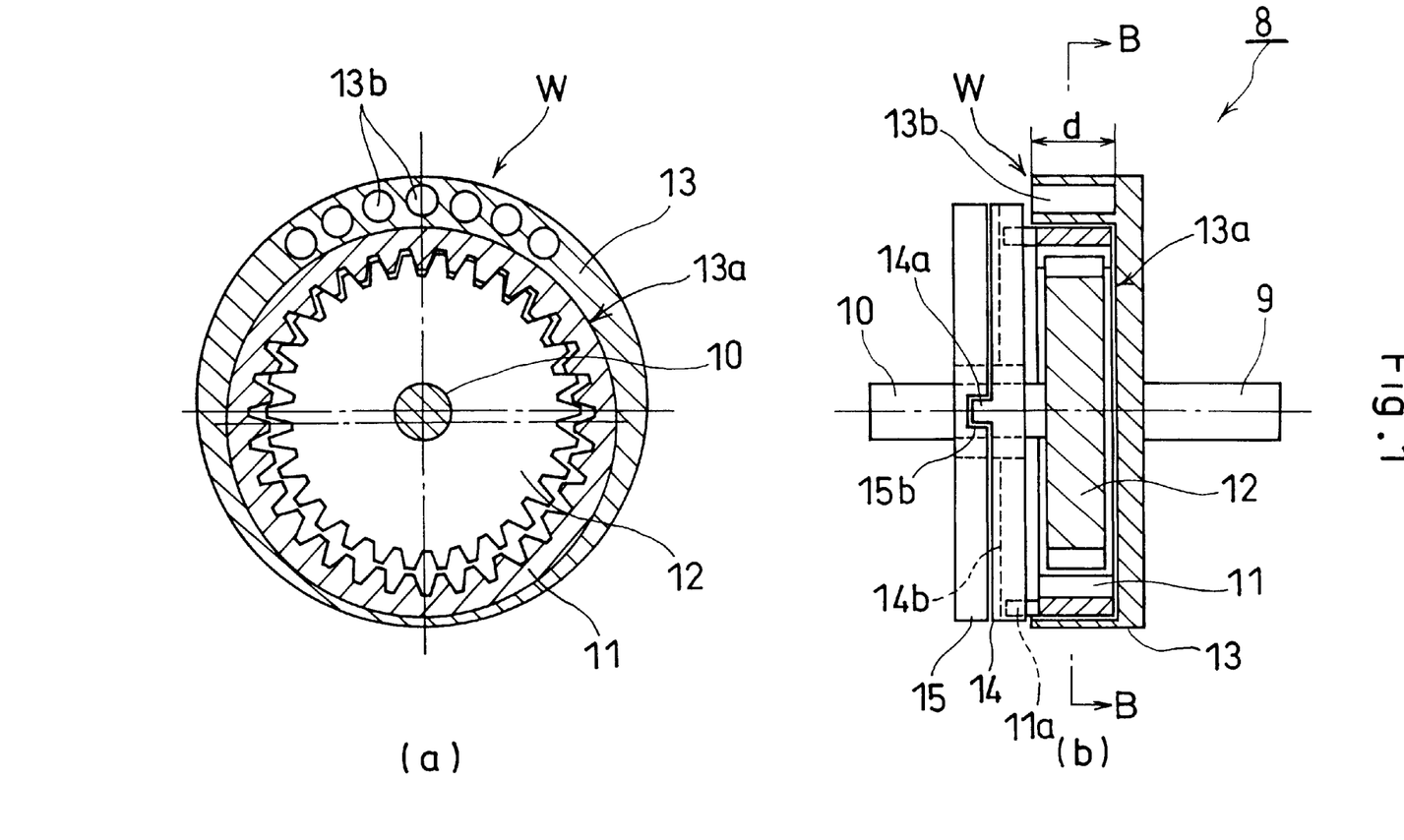
FIG. 1 shows a gear device according to a first embodiment of the present invention, in which a part (b) is a sectional view showing a major portion of the gear device, and a part (a) is a sectional view taken along a line B—B of the part (b).

FIG. 1 shows a gear device 8 according to a first embodiment of the present invention. Note that FIG. 1(b) is a sectional view showing a major portion of the gear device 8, and FIG. 1(a) is a sectional view taken along a line B—B of FIG. 1 (b).

The gear device 8 is designed as that two gears, i.e., a ring gear 11 and a planetary gear 12 are disposed between an input shaft 9 and an output shaft 10 which are arranged coaxial to each other, thereby performing a speed-reduction of one stage. A disk 13 is fixed to the input shaft 9, whereas the planetary gear 12 is fixed to the output shaft 10.

A circular recess portion 13a is formed in the disk 13 in an eccentric manner with respect to the input shaft 9. And, the ring gear 11 is rotatably supported by the circular recess portion 13a, which is engaged with the planetary gear 12.

Further, a weight-reduced portion 13b having the same depth d with that of the recess portion 13a are formed in a part of the disk 13 where the recess portion 13a is not formed. By forming the weight-reduced portion 13b having the same depth d with that of the recess portion 13a in the part of the disk 13 where the recess portion 13a is not formed, a weight portion W is formed to recover the axial dynamic balance of the disk 13, which is lost by arranging the recess portion 13a and the ring gear 11 in the disk 13.

The weight-reduced portion 13b is formed by a plurality of circular holes having the same diameter as shown in FIG. 1 (a), but the weight-reduced portion 13b may be designed as that a plurality of weight-reduced portions become smaller in their diameter as getting farther from a center toward lateral ends. Moreover, a plurality of circular holes may be replaced with a notch or notches partially cutting a peripheral end portion of the disk 13. And, it is not essential for the disk 13 to have a mono-structure, and for example, it may be axially divided at the depth d in FIG. 1 (b).

The gear device 8 is provided with two plates 14 and 15 located adjacent to the ring gear 11 in the direction of axis, and the plates have central portions into which the output shaft 10 is inserted. The plate 15 is fixed to a casing (not shown) of the gear device so that the rotation thereof is restricted. The plate 15 is provided with a key slot 15b with which a key 14a provided on the plate 14 is slidably engaged. The opposing surface of the plate 14 to the ring gear 11 is provided with a key slot 14b extending in a direction perpendicular to the key 14a. A key 11a provided on the ring gear 11 is slidably engaged with the key slot 14b. With the above arrangement, a linking element corresponding to a universal joint J shown in FIG. 7 is constructed, but the linking element is not limited to this construction.

With the arrangement described above, a rotating motion of the ring gear 11 is restricted by the plates 14 and 15. When the input shaft 9 is rotated integrally with the disk 13, the ring gear 11 performs only an eccentric motion within the recess portion 13a of the disk 13. The ring gear 11 performing only the eccentric motion is engaged with the planetary gear 12 fixed coaxially to the output shaft 10. The engagement between the ring gear 11 and the planetary gear 12 caused by the eccentric motion of the ring gear 11 rotates the planetary gear 12 and drives the output shaft 10.

The gear device 8 with the above-described construction according to the first embodiment of the present invention provides the following functions and effects: in the disk 13 of the gear device 8, the weight portion W is formed to recover the axial dynamic balance of the disk 13, which is lost by arranging the recess portion 13a and the ring gear 11 circularly shaped. Further, since the planetary gear 12 engaged with the ring gear 11 is fixed coaxially to the output shaft 10, the planetary gear 12 does not perform the eccentric motion and thereby the dynamic balance thereof is secured. Accordingly, the dynamic balance in the axial direction can be secured for every individual rotating element constructing the gear device 8.

Moreover, since the weight portion W is formed by the disk 13 per se, it is unnecessary to additionally prepare a member onto the disk 13 for attaining the axial balance of the disk 13. Accordingly, the gear device can be simplified in its structure. Further, by arranging the depth of the weight-reduced portion 13b to be equal to the depth d of the circular recess portion 13a, the axial dynamic balance of the disk 13 can be secured, which may otherwise be lost by arranging the circular recess portion 13a in the disk 13.

Further, if the weight-reduced portion 13b is formed by a plurality of circular holes having the same diameter, a common tool or a processing program can be applied to all the processes of forming the weight-reduced portion 13b. Accordingly, when processing the weight-reduced portion 13b, manufacturing process can be reduced. If the weight-reduced portion 13b is formed as that a plurality of circular holes have diameters being gradually changed, more ideal balance can be attained.

If the disk 13 is arranged to be axially dividable, material using for each part of the disk can be more freely selected. Accordingly, the following features can be attained depending on its object: the light-weight, increased rigidity, easy-to-process, low cost, and the like. And, if one of the axially divided members to have a constant thickness is processed to have the circular recess portion 13a and the weight-reduced portion 13b, and thereafter integrated with the other axially divided members, the thickness d of the circular recess portion 13a and the weight-reduced portion 13b can be easily matched with one another.

According to the gear device of the first embodiment of the present invention, it becomes possible to provide a gear device capable to improve the dynamic balance in a so-called S-P-C type planetary gear mechanism, and suppress the generation of the vibrations under various use conditions. Further, the precise gear device can be provided at low cost while simplifying the structure of the gear device.

Figure 2:
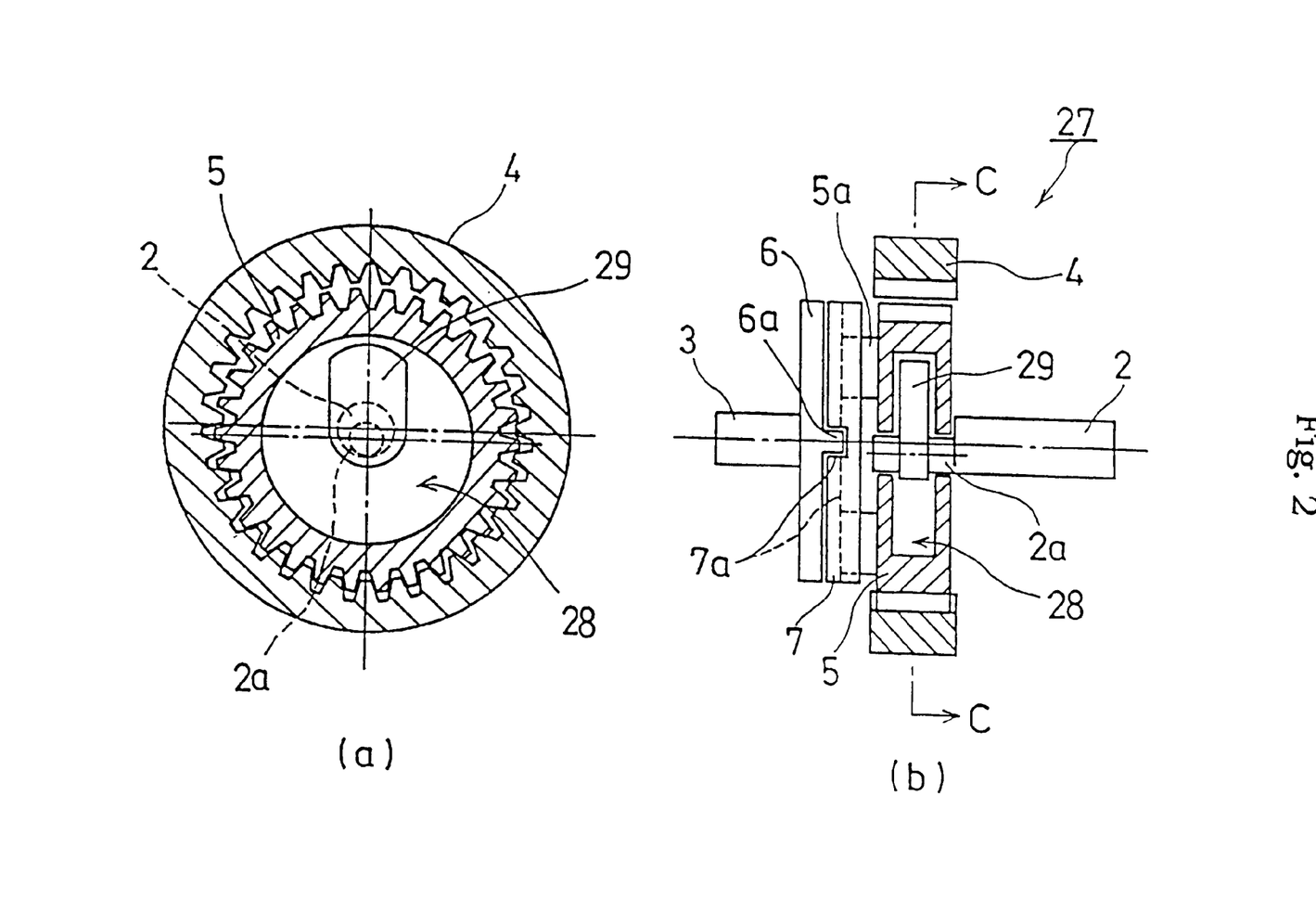
FIG. 2 shows a gear device according to a second embodiment of the present invention, in which a part (b) is a sectional view showing a major portion of the gear device, and a part (a) is a sectional view taken along a line C—C of the part (b).

FIG. 2 shows a gear device 27 according to a second embodiment of the present invention. Note that FIG. 2(b) is a sectional view showing a major portion of the gear device 27 according to the present embodiment, and FIG. 2(a) is a sectional view taken along a line C—C of FIG. 2(b). Here, those portions, which are the same as or correspond to the prior art or the first embodiment, are denoted by the same reference numerals, and detailed description for those portions is omitted.

Similar to the gear device 8 shown in FIG. 1, the gear device 27 is designed as that two gears, i.e., a ring gear 4 and a planetary gear 5 are disposed between an input shaft 2 and an output shaft 3 which are arranged coaxial to each other, thereby performing a speed-reduction of one stage. However, in the gear device 27, the input shaft 2 is provided with an eccentric portion 2a same as the conventional gear device 1 (FIG. 8), so that the planetary gear 5 is axially supported by the portion in an eccentric state.

The planetary gear 5 is provided with a cavity portion 28, in which a weight portion 29 for recovering the balance of the planetary gear 5 is provided. The weight portion 29 is fixed to the eccentric portion 2a of the input shaft 2 such that the eccentric motion of the center of gravity of the weight portion 29 is opposite to the eccentric motion of the center of gravity of the planetary gear 5. And, the weight portion 29 is rotated with the input shaft 2 within the cavity portion 28. The weight portion 29 is fixed to the eccentric portion 2a so as to be located at a central part in the thickness direction of the planetary gear 5. The shape of the weight portion 29 is not limited to the illustrated oval shape, and may be suitably selected from a fan shape, a circular shape or other preferable shapes.

With this arrangement, the center of gravity of the planetary gear 5 and the one of the weight portion 29 are constantly positioned to be counterbalanced, and therefore it is possible to secure the axial dynamic balance of the planetary gear 5 that is a rotating element of the gear device 27. In other words, since the balance of the planetary gear 5, axially supported by the eccentric portion 2a of the input shaft 2 while performing the eccentric motion, can be recovered within the planetary gear, the axial dynamic balance of the planetary gear 5 can be attained, and thereby the dynamic balance of the entire gear device 27 is successfully secured.

According to the gear device of the second embodiment of the present invention, it is also possible to provide a gear device which can improve the dynamic balance in a so-called S-P-C type planetary gear mechanism while suppressing the generation of the vibrations under various use conditions.

As an application example of the first and second embodiments of the present invention, electrically driven actuators will be described with reference to FIGS. 3 to 6. Note that those portions, which are the same as or correspond to the portions in the first and second embodiments of the present invention, are denoted by the same reference numerals, and detailed description for those portions is omitted.

Figure 3:
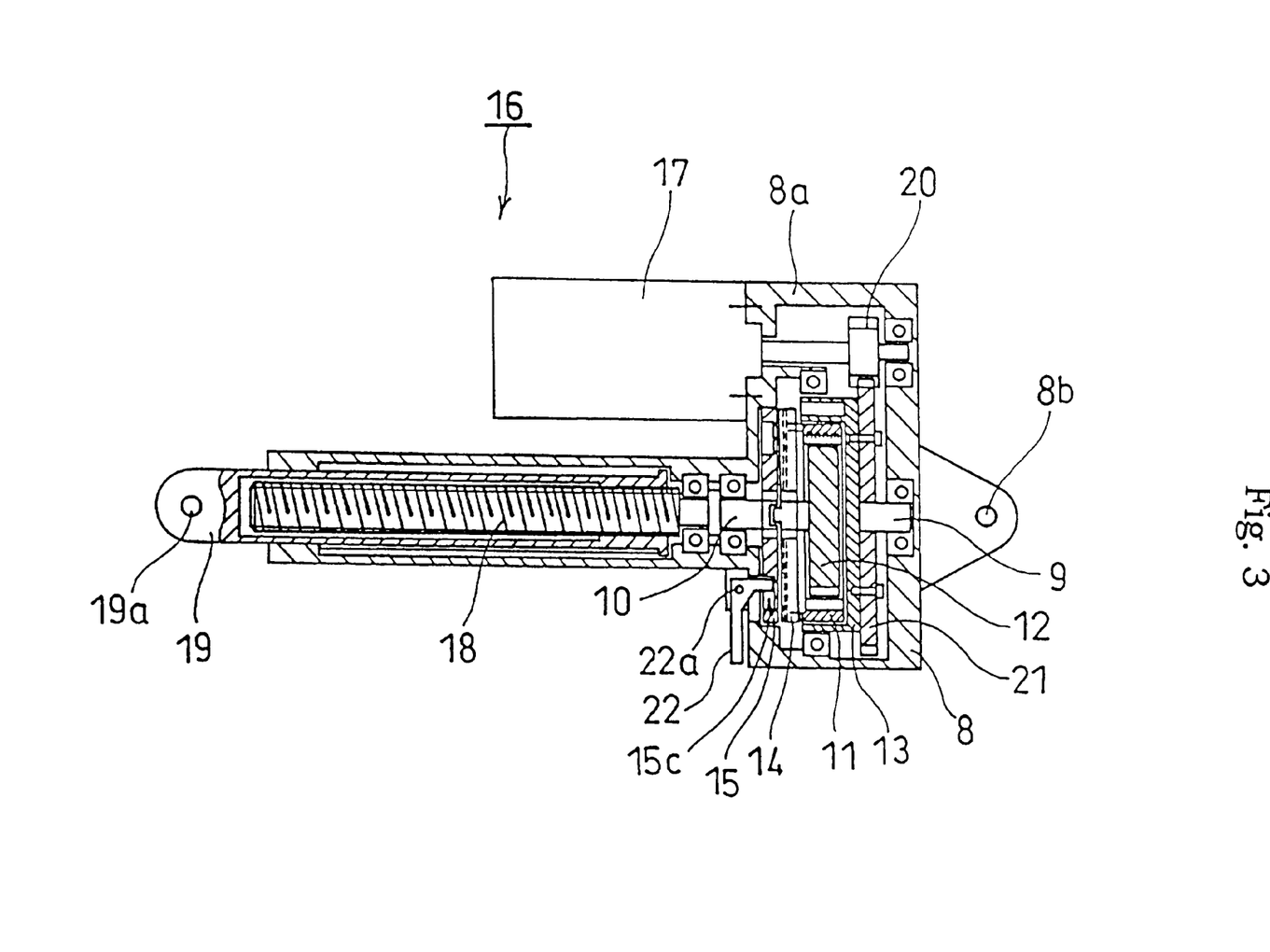
FIG. 3 is a sectional view showing a major portion of an electrically driven actuator which is an application example of the first and second embodiments of the present invention.

In an electrically driven actuator 16 shown in FIG. 3, the output of a motor 17 is transmitted to a threaded shaft 18 (a trapezoidal threaded shaft) through the gear device 8 shown in FIG. 1 so as to cause a linear axial motion of a plunger 19 engaged with the threaded shaft 18. The motor 17 is fixed to a casing 8a of the gear device 8. And, a gear 20 (a spur gear) is fixed to the output shaft of the motor, and a gear 21 engaged with the gear 20 is fixed to the disk 13 of the gear device. Further, the output shaft 10 of the gear device is fixed to the threaded shaft 18.

The casing 8a is provided with a stopper 22. By engaging the stopper 22 with a key groove 15c formed in the plate 15, the plates 14 and 15 for restricting the rotating motion of the ring gear 11 are fixed to the casing 8a. By rotating the stopper 22 in FIG. 3 at the center of a pivot 22a in a clockwise direction to release the engaged state between a leading end portion of the substantially L-shaped stopper 22 and the key groove 15c, the plates 14, 15 and the ring gear 11 can be freely rotated to the casing 8a. Reference numerals 8b and 19a respectively designate pivot holes formed in the casing 8a and the plunger 19 for connecting with a driven member (such as a robot arm) of the electrically driven actuator 16.

According to this electrically driven actuator 16, since the number of revolutions of the motor 17 can be reduced by the gear device 8, and thereafter transmitted to the threaded shaft 18, a large driving force can be obtained with a motor of a small output capacity. And, the electrically driven actuator 16 enjoys all the advantageous features the gear device 8 possesses, so that the generation of the vibrations can be successfully suppressed. Further, since the gear device 8 features both preciseness and low-cost, the electrically driven actuator also takes same features of the above.

Moreover, the key slot 15c in the plate 15 and the stopper 22 are provided as a restriction-release means for the rotating motion of the ring gear 11 to the casing 8a, and the engagement and disengagement between them can be freely performed from the exterior of the casing 8a, which gives another operational variability of the electrically driven actuator. As to the other functions and effects of the electrically driven actuator 16 using the gear device 8, which have been already described with reference to the gear device 8 of the first embodiment of the present invention, the detailed description therefor is omitted here.

Figure 4:
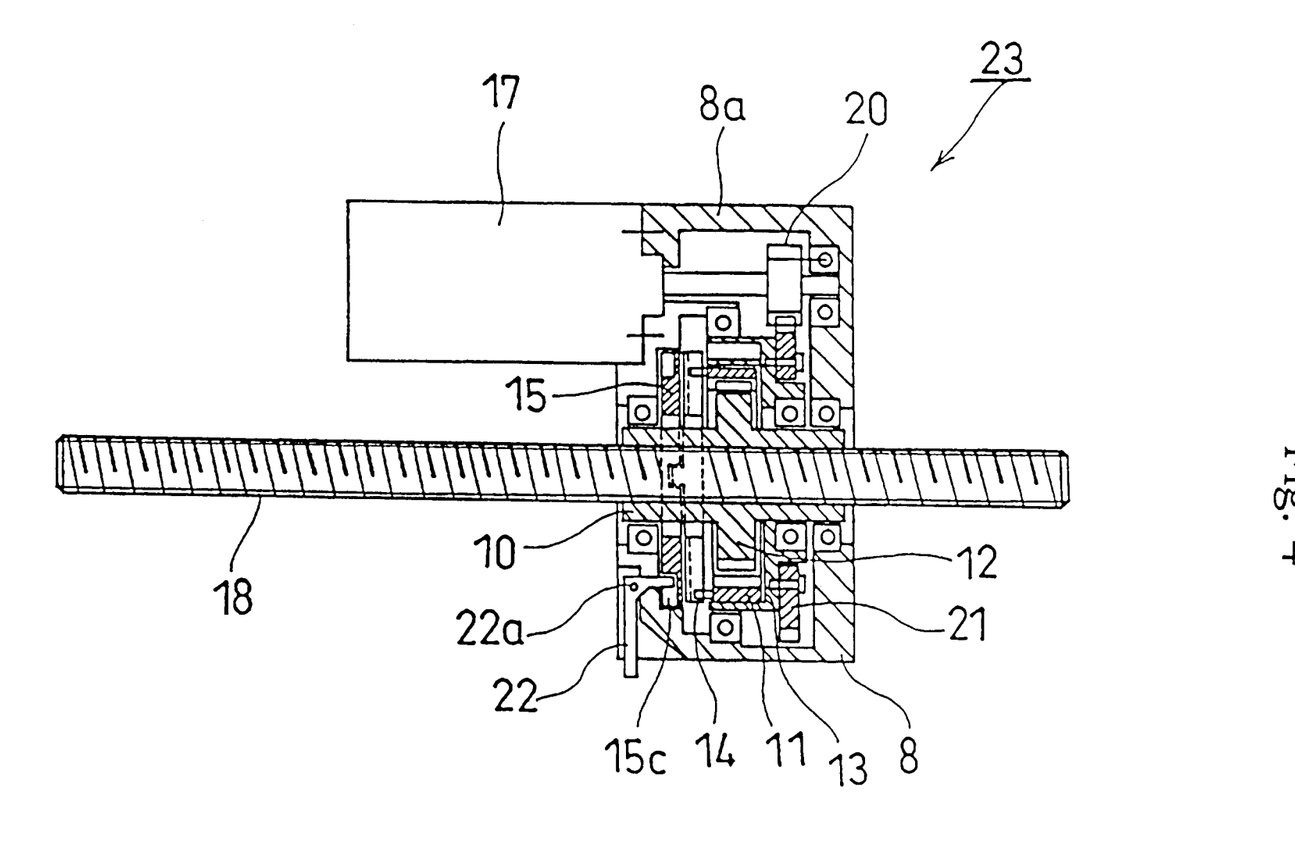
FIG. 4 is a sectional view showing a major portion of an application example of the electrically driven actuator shown in FIG. 3.

An electrically driven actuator 23 shown in FIG. 4 has substantially the same structure as that of the electrically driven actuator 16 shown in FIG. 3, but allows the following different points; the output shaft 10 is formed as a hollow shaft, and a threaded groove engaged with the threaded shaft 18 is formed in an inner wall of the hollow shaft. Accordingly, the threaded shaft 18 is penetrated through the gear device 8, and thereby freely movable in the axial direction.

The structure in which the output shaft 10 is formed as the hollow shaft has been readily put into practice, since the gear device 8 employs such a structure that the planetary gear 12 per se does not perform the eccentric motion, and the output shaft 10 has a sufficient diameter to enable the threaded shaft 18 penetrated therethrough. As to the other functions and effects similar to those of the electrically driven actuator 16 shown in FIG. 3, the detailed description therefor is omitted here.

Figure 5:
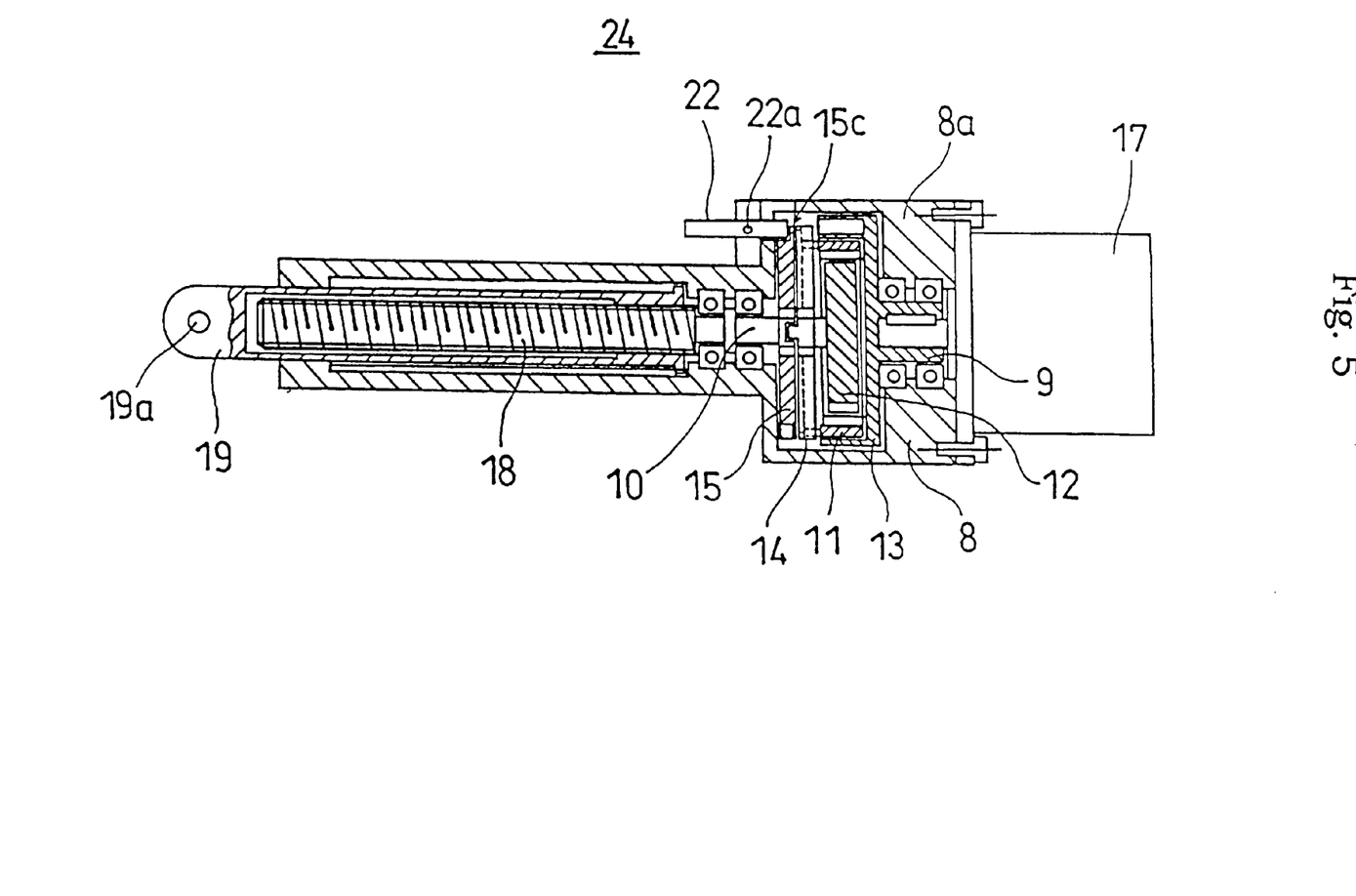
FIG. 5 is a sectional view showing a major portion of another application example of the electrically driven actuator shown in FIG. 3.
Figure 6:
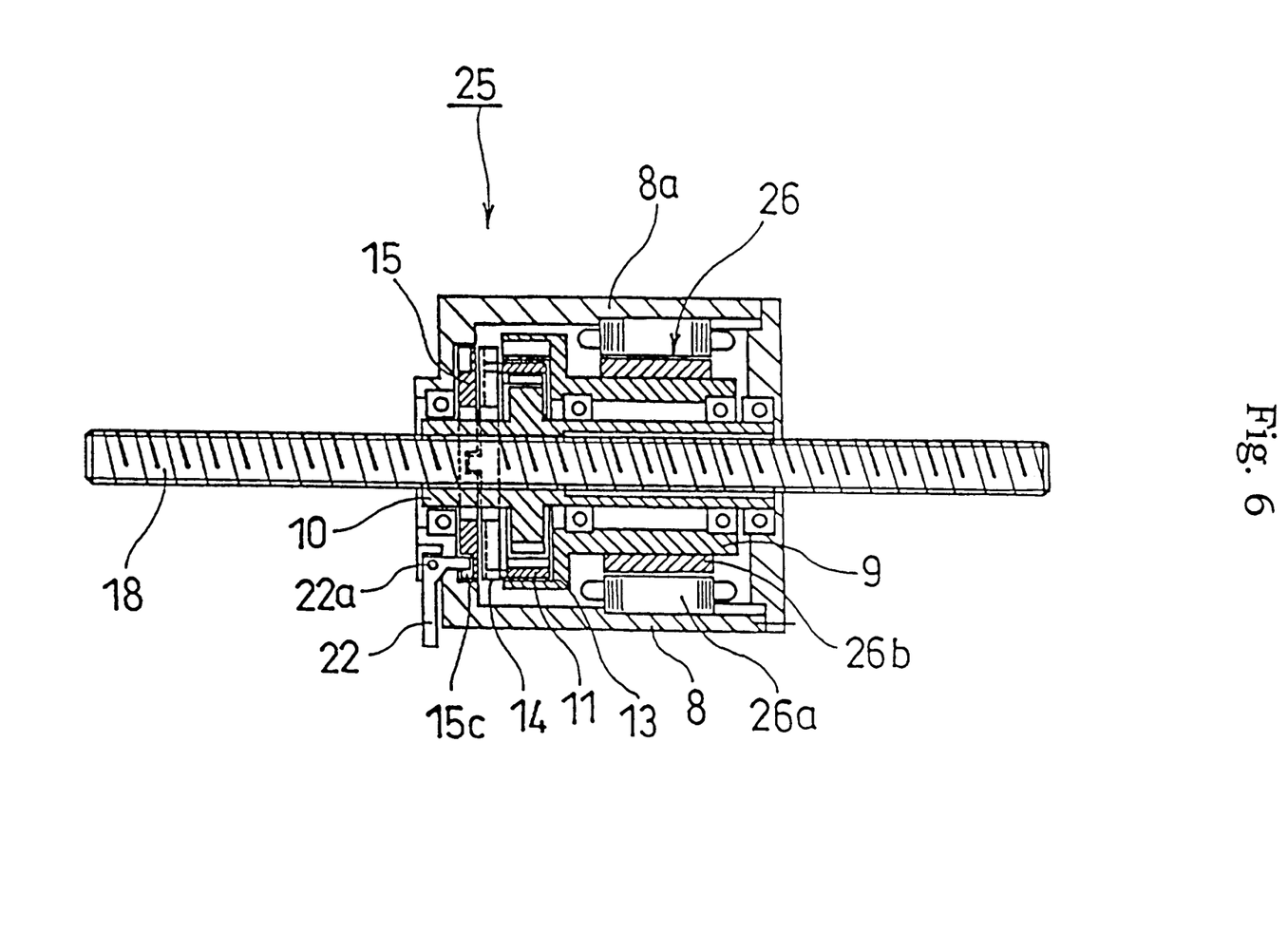
FIG. 6 is a sectional view showing a major portion of yet another application example of the electrically driven actuator shown in FIG. 3.

An electrically driven actuator 24 shown in FIG. 5 is another application example based on the electrically driven actuator 16 shown in FIG. 3. The output shaft of the motor 17 is directly coupled to the input shaft 9 of the gear device 8, so that the input shaft 9 and the output shaft 10 of the gear device 8, the motor 17 and the threaded shaft 18 are all arranged coaxially. And, an electrically driven actuator 25 shown in FIG. 6 is a further application example based on the electrically-driven actuator 23 shown in FIG. 4, in which, the input shaft 9 and the output shaft 10 of the gear device 8, the threaded shaft 18 and a hollow motor 26 are all arranged coaxially by integrally providing the hollow motor 26 within the casing 8a of the gear device 8. In addition, a coil of the hollow motor 26 and a magnet fixed to the input shaft 9 are respectively designated by reference numerals 26a and 26b.

In each of the electrically driven actuator 24 shown in FIG. 5, and the electrically driven actuator 25 shown in FIG. 6, all the component elements are arranged coaxially to realize the miniaturization of the electrically driven actuator. As to the functions and effects similar to those of the electrically driven actuators 16 and 23, the detailed description therefor is omitted here. In each of the electrically driven actuators 16 and 24 (actuators of a type in which the threaded shaft 18 does not penetrate through the gear device 8), the gear device 27 according to the second embodiment of the present invention can be applied in place of the gear device 8 according to the first embodiment of the present invention without having any effects on providing an actuator characterized by low vibration and high precision.

The present invention thus constructed provides the following effects; in the gear device according to the first aspect of the present invention, it is capable of providing a gear device which can improve the dynamic balance in a so-called S-P-C type planetary gear mechanism, and suppress the generation of the vibrations under various use conditions.

According to the second aspect of the present invention, the dynamic balance for each rotating element can be secured, and thus provide a gear device the vibrations of which are reduced. Further, the gear device can be simplified in its structure for providing a low-cost and precise gear device.

In the gear device according to the third aspect of the present invention, the dynamic balance of each rotating element can be secured with a simplified arrangement. In the gear device according to the fourth aspect of the present invention, the gear device can be provided while reducing processing steps. In the gear device according to the fifth aspect of the present invention, more ideal balance can be attained, thereby being able to provide a precise gear device with less vibration.

In the gear device according to the sixth aspect of the present invention, the following feature can be realized depending on the object: the light-weight, increased rigidity, easy-to-process, low cost and the like.

In the gear device according to the seventh or eighth aspect of the present invention, the dynamic balance can be secured for every individual rotating element, so that a gear device with less vibration can be provided.

What is claimed is:

1. A gear device which performs a speed-reduction of one stage using two gears disposed between an input shaft and an output shaft coaxially arranged, wherein a dynamic balance in an axial direction is secured for every individual rotating element, said rotating element including:

a disk that has a circular recess portion arranged eccentric to said input shaft and that is fixed to said input shaft;

a ring gear that is rotatably supported by said circular recess portion and whose rotating motion is restricted so that said ring gear only performs an eccentric motion within said circular recess portion when said disk is rotated; and a planetary gear that is fixed coaxially to said output shaft and engaged with said ring gear;

wherein a weight portion is formed in said disk to recover the axial dynamic balance which is lost by arranging said circular recess portion and said ring gear.

2. The gear device as claimed in claim 1, wherein said weight portion includes a weight-reduced portion, having the same depth to said circular recess portion, formed in a portion of said disk where said circular recess portion is not provided.

3. The gear device as claimed in claim 2, wherein said weight-reduced portion is formed by a plurality of circular holes having the same diameter.

4. The gear device as claimed in claim 1, wherein said rotating elements include a planetary gear that is axially supported by an eccentric portion provided on said input shaft, and that is engaged with a fixed ring gear to perform rotating and revolving motions, and wherein said planetary gear is provided with a cavity portion within which a weight portion is provided to recover a balance of said planetary gear.

5. The gear device as claimed in claim 4, wherein said weight portion is fixed to said eccentric portion of said input shaft such that an eccentric motion of the center of gravity of said weight portion is opposite to the eccentric motion of the center of gravity of said planetary gear.

\* \* \* \* \*